United States Patent
Lee et al.

(10) Patent No.: US 8,284,680 B2
(45) Date of Patent: Oct. 9, 2012

(54) METHOD AND APPARATUS FOR MULTICAST TRANSMISSION IN WIRELESS NETWORK

(75) Inventors: Sangwoo Lee, Daejeon (KR); Hyun Seo Oh, Daejeon (KR); June Koo Rhee, Daejeon (KR); Yonghwan Bang, Daejeon (KR); Dujeong Lee, Seoul (KR)

(73) Assignees: Electronics and Telecommunications Research Institute, Daejeon (KR); Korea Advanced Institute of Science and Technology, Daejeon (KR)

( * ) Notice: Subject to any disclaimer, the term of this patent is extended or adjusted under 35 U.S.C. 154(b) by 350 days.

(21) Appl. No.: 12/717,534

(22) Filed: Mar. 4, 2010

(65) Prior Publication Data

US 2010/0226243 A1 Sep. 9, 2010

(30) Foreign Application Priority Data

Mar. 5, 2009 (KR) .................. 10-2009-0019020
Mar. 4, 2010 (KR) .................. 10-2010-0019302

(51) Int. Cl.
*H04L 12/26* (2006.01)
(52) U.S. Cl. .................. 370/242; 370/473; 370/349
(58) Field of Classification Search .................. 370/389, 370/216, 242, 312, 314, 349, 400, 473
See application file for complete search history.

(56) References Cited

U.S. PATENT DOCUMENTS

| | | | |
|---|---|---|---|
| 7,190,681 B1* | 3/2007 | Wu | 370/316 |
| 7,733,911 B2* | 6/2010 | Lee | 370/473 |
| 7,912,003 B2* | 3/2011 | Radunovic et al. | 370/329 |
| 8,180,915 B2* | 5/2012 | Zhao | 709/231 |

OTHER PUBLICATIONS

Dong Nguyen et al., "Wireless Broadcasting Using Network Coding", IEEE Transactions on Vehicular Technology, vol. 58, Iss. 2, 6 pages, Feb. 2009.

* cited by examiner

*Primary Examiner* — Brenda H Pham
(74) *Attorney, Agent, or Firm* — Staas & Halsey LLP

(57) ABSTRACT

The present invention provides a method and apparatus for multicast transmission of a transmitting station in a wireless network. The method according to the present invention transmits a plurality of data packets to a plurality of receiving stations, receives information on loss of the plurality of the data packets from at least one of the plurality of the receiving stations, codes the plurality of the data packets into a single coded data packet based on the information on the loss of the plurality of the data packets and transmits an error control frame including the coded data packet to the plurality of the receiving stations. Therefore, when an error occurs at a data packet that a transmitting station transmits to a plurality of receiving stations by a multicast transmission, a number of retransmission of the data packet can be reduced.

10 Claims, 10 Drawing Sheets

METHOD AND APPARATUS FOR MULTICAST TRANSMISSION IN WIRELESS NETWORK

CROSS-REFERENCE TO RELATED APPLICATION

This application claims priority to and the benefit of Korean Patent Application No. 10-2009-0019020 and 10-2010-0019302 filed in the Korean Intellectual Property Office on Mar. 5, 2009 and Mar. 4, 2010, the entire contents of which are incorporated herein by reference.

BACKGROUND OF THE INVENTION (a) Field of the Invention

The present invention relates to a method and apparatus for multicast transmission in a wireless network.

(b) Description of the Related Art

A wireless local area network (WLAN) has been widely used in a home and a business. A wireless LAN technology represented by IEEE 802.11 can wirelessly connect the networks through an air interface.

Meanwhile, when wirelessly connecting the networks, it can be easily exposed to an interference such as multipath, collision, noise, etc. Thus, it is difficult to transmit data reliably. In particular, the wireless LAN is more difficult to transmit data with reliability in multicast transmission simultaneously transmitting data to a plurality of receivers in characteristics of a medium access control (MAC) layer.

In the wireless LAN environment, a forward error correction (FEC) scheme is considered for a reliable multicast transmission. According to the FEC scheme, a transmitter carries additional bits with each packet. When an error occurs, a receiver uses the additional bits to recover the error. According to the FEC scheme, when communicating in the wireless environment with large error probability or transmitting large packet, a large amount of bandwidth is wasted. In addition, when collisions between frames transmitted from a plurality of transmitters occur, a receiver cannot recover error.

In addition, in the wireless LAN environment, a packet retransmission scheme using acknowledgement/negative-acknowledgement (ACK/NACK) is considered for the reliable multicast transmission. According to the packet retransmission scheme, each receiving station reports the receiving state of the data packet to a transmitting station and the transmission station recovers error by retransmitting a lost data packet. However, the packet retransmission scheme has a problem in that the packet retransmission probability is linearly increased based on the number of receiving stations. For example, in a unicast transmission that a single transmitting station transmits packets to a single receiving station, when the packet error probability is 0.001, the transmission station retransmits one packet every time it transmits 1000 packets. However, in the multicast transmission that a single transmitting station transmits packets to 100 receiving stations, when the packet error probability is 0.001, the transmission station retransmits one packet every time it transmits 10 packets. As described above, in the multicast transmission, a number of retransmission of packets is increased in proportion to the number of receiving stations. Thus, performance of the system is deteriorated.

SUMMARY OF THE INVENTION

The present invention has been made in an effort to provide a method and apparatus for a reliable multicast transmission. In particular, the present invention provides a method and apparatus for reducing a number of retransmission of data packets for error control when a transmitting station multicasts to a plurality of receiving stations.

According to an exemplary embodiment of the present invention, a method for multicast transmission of a transmitting station in a wireless network comprises transmitting a plurality of data packets to a plurality of receiving stations, receiving information on loss of the plurality of the data packets from at least one of the plurality of the receiving stations, coding the plurality of the data packets into a single coded data packet based on the information on the loss of the plurality of the data packets and transmitting an error control frame including the coded data packet to the plurality of the receiving stations.

According to another exemplary embodiment of the present invention, a method for controlling error of multicast transmission in a wireless network by a receiving station comprises receiving a data block including a plurality of data packets from a transmitting station, checking whether at least one lost data packet exists in the plurality of the data packets, if there is the at least one lost data packet, transmitting packet loss information to the transmitting station, receiving an error control frame including a single coded data packet coded based on the packet loss information and recovering the at least one lost data packet using the error control frame and the plurality of the data packets.

A transmitting station according to another exemplary embodiment of the present invention comprises a transmitting data processor that performs processes to receive a plurality of data packets from an upper layer and to transmit the plurality of the data packets to a receiving station, a transmitting buffer that stores the plurality of the data packets received from the transmitting data processor and coding unit that codes the plurality of the data packets stored in the transmitting buffer into a single coded data packet when receiving packet loss information on the plurality of the data packet from the receiving station.

A receiving station according to another embodiment of the present invention comprises a receiving data processor that receives a data block including a plurality of data packets from a transmitting station and checks whether at least one lost data packet exists in the data block, a packet loss information generator that generates packet loss information and transmits the packet loss information to the transmitting station when the at least one lost data packet exists in the data block and a decoding unit that recovers the at least one lost data packet using an error control frame and the plurality of the data packets when receiving the error control frame including a coded data packet coded based on the packet loss information from the transmitting station.

According to the exemplary embodiment of the present invention, when an error occurs at a data packet that a transmitting station transmits to a plurality of receiving stations by a multicast transmission, a number of retransmission of the data packet can be reduced. In addition, the transmitting station can easily control errors when lengths of a plurality of data packets are different. Therefore, it can be applied to wide application fields of an upper layer.

DETAILED DESCRIPTION OF THE EMBODIMENTS

Figure 1:
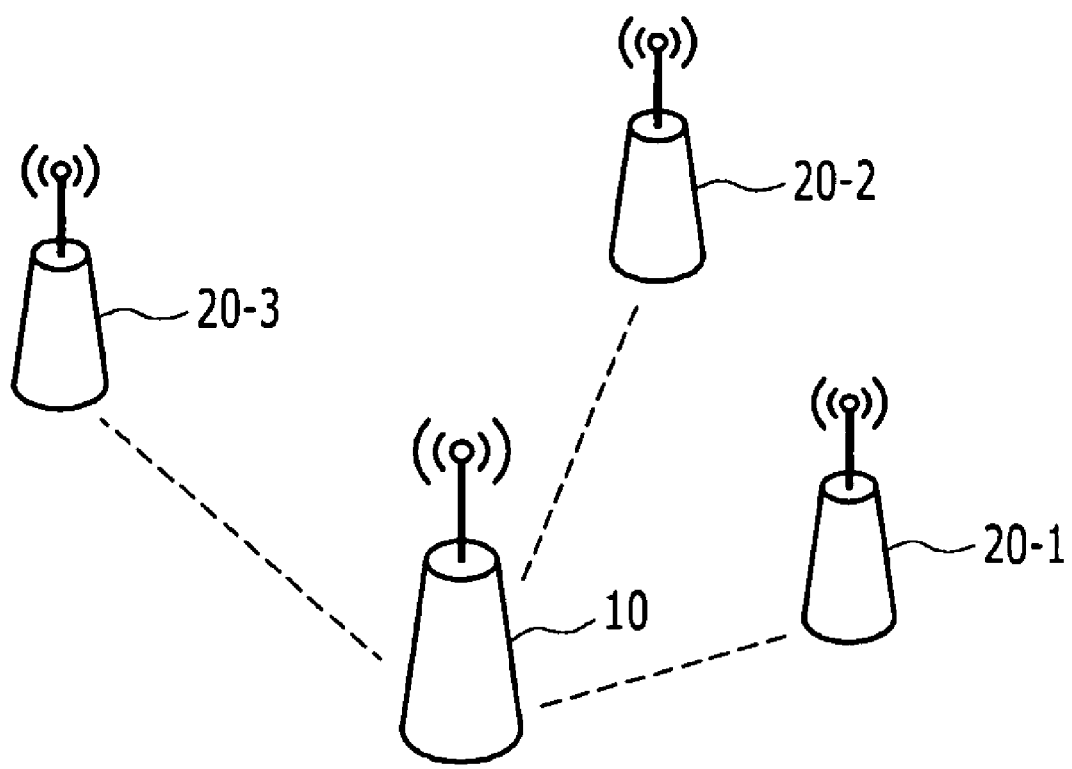
FIG. 1 shows a wireless network system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

In the specification, a receiving station may designate a mobile station (MS), a terminal, a mobile terminal (MT), a subscriber station (SS), a portable subscriber station (PSS), user equipment (UE), access terminal (AT), etc. and may include the entire or partial functions of the mobile station, the terminal, the mobile terminal, the subscriber station, the portable subscriber station, the user equipment, the access terminal, etc.

In the specification, a transmitting station may designate a base station (BS), an access point (AP), a radio access station (RAS), a node B, an evolved nodeB (eNodeB), a base transceiver station (BTS), a mobile multihop relay (MMR)-BS, etc. and may include the entire or partial functions of the base station, the access point, the radio access station, the node B, the eNodeB, the base transceiver station, the MMR-BS, etc.

In the specification, a multicast transmission means that a transmitting station simultaneously transmits data to a plurality of receiving stations. The multicast transmission can be interchanged with a broadcast transmission, a point to multipoint transmission, etc.

FIG. 1 shows a wireless network system according to an exemplary embodiment of the present invention.

Referring to FIG. 1, a wireless network system includes a transmitting station 10 and a plurality of receiving stations 20-1, 20-2, and 20-3. The transmitting station 10 transmits data to the plurality of the receiving stations 20-1, 20-2, and 20-3 in a multicast transmission scheme. The wireless network system may be a wireless LAN system.

Figure 2:
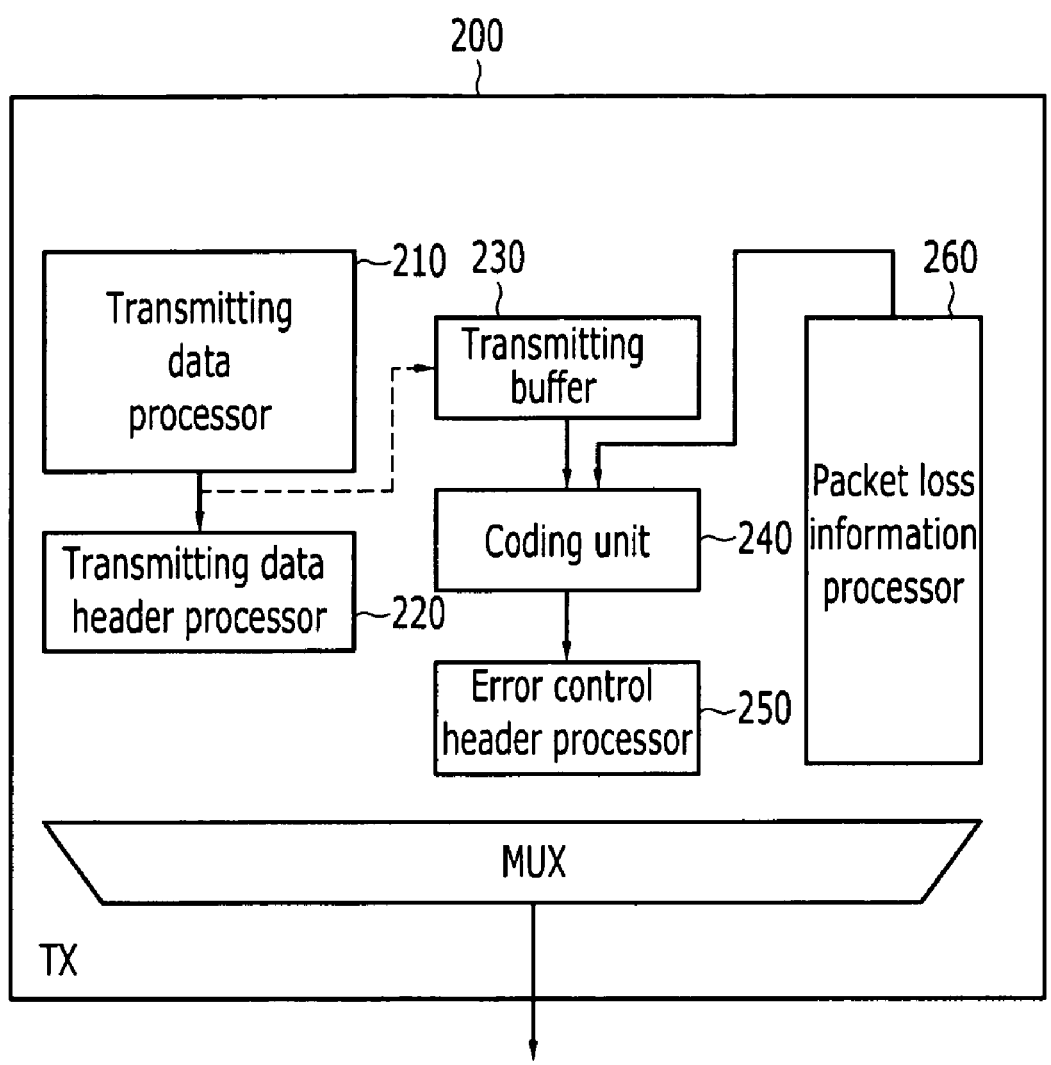
FIG. 2 shows an inner structure of MAC layer of a transmitting station in a wireless network system according to an exemplary embodiment of the present invention.
Figure 3:
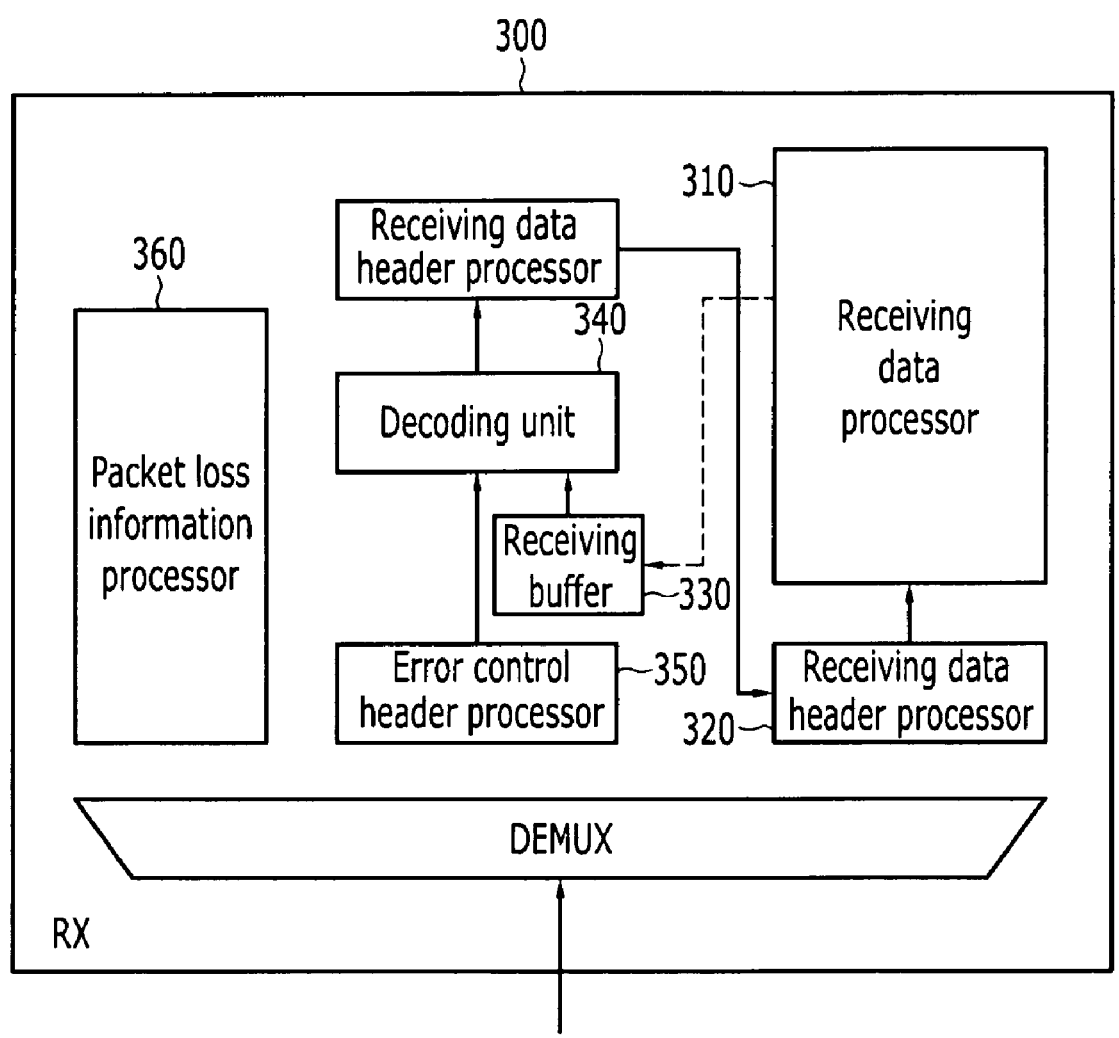
FIG. 3 shows an inner structure of an MAC layer of a receiving station in a wireless network system according to an exemplary embodiment of the present invention.
Figure 4:
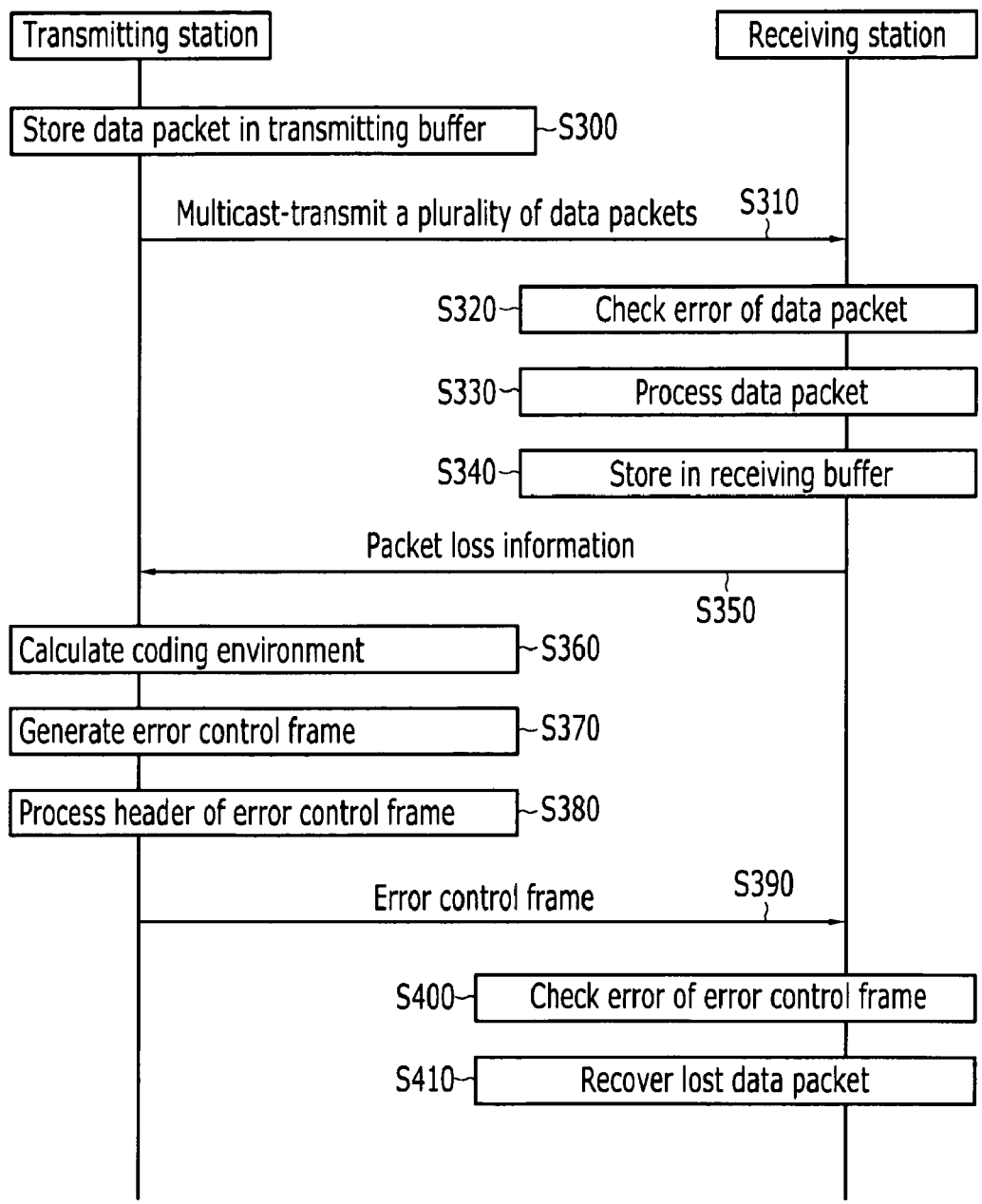
FIG. 4 shows a multicast transmission and error control method of a transmitting station in a wireless network system according to an exemplary embodiment of the present invention.

FIG. 2 shows an inner structure of an MAC layer of a transmitting station in a wireless network system according to an exemplary embodiment of the present invention, FIG. 3 shows an inner structure of an MAC layer of a receiving station in a wireless network system according to an exemplary embodiment of the present invention, and FIG. 4 shows a multicast transmission and error control method of a transmitting station in a wireless network system according to an exemplary embodiment of the present invention.

Referring to FIGS. 2 and 3, a transmitting station 200 comprises a transmitting data processor 210, a transmitting data header processor 220, a transmitting buffer 230, a coder 240, an error control header processor 250 and a packet loss information processor 260. A receiving station 300 comprises a receiving data processor 310, a receiving data header processor 320, a receiving buffer 330, a decoder 340, an error control header processor 350, and a packet loss information generator 360.

The transmission data processor 210 of the transmitting station 200 receives data (for example, MAC service data unit (SDU)) from an upper layer. The transmitting data processor 210 processes data received from the upper layer to generate data packets (for example, MAC protocol data unit (PDU)) to be transmitted to a lower layer or the receiving station. For example, the transmitting data processor 210 processes sequence number assignment, integrity protection, fragmentation, encryption and Integrity, etc. The transmitting data header processor 220 adds a header and data for cyclic redundancy check (CRC) to the data packets received from the transmitting data processor 210 and transmits them to the plurality of the receiving stations. Meanwhile, the transmitting station 200 stores a copy of the data packets, which are processed in the transmitting data processor 210, in the transmitting buffer 230 for each flow, in order to control errors. The data packets stored in the transmitting buffer 230 can be used to generate an error control frame.

The receiving station 300 receives the plurality of the data packets from the transmitting station 200. The receiving data header processor 320 of the receiving station 300 removes headers from the received data packets and checks a CRC to detect an error. The receiving data processor 310 processes the data packets to generate data (for example, MAC SDU) to be transmitted to an upper layer. For example, the receiving data processor 310 removes a copy of the data packets, reorders the data packets, performs decryption, integrity check, defragmentation, integrity protection and replay detection, etc., and transmits the data packets to the upper layer. Meanwhile, the receiving station 300 may store a copy of the data packets, which are processed in the receiving data processor 310, in the receiving buffer 330 for each flow, in order to control errors.

Hereinafter, a method for controlling errors of the receiving station 300 will be described with reference to FIGS. 2 to 4 when an error occurs in the data packets received from the transmitting station 200.

The transmitting buffer 230 of the transmitting station 200 stores the data packets processed in the transmitting data processor 210 for each flow (S300) and transmits the plurality of the data packets processed in the transmitting data processor 210 to the receiving station 300 (S310). For better comprehension and ease of description, the case where the transmitting station 200 transmits the data packets to single receiving station 300 is shown, but the transmitting station 200 can transmit the data packets to the plurality of receiving stations 300 in the multicast transmission scheme.

The receiving data header processor 320 of the receiving station 300 checks whether errors occur in the data packets received from the transmitting station 200 (S320) and the receiving data processor 310 processes to transmit the data packets to the upper layer (S330). The receiving buffer 330 stores a copy of received data packets for each flow (S340). The receiving buffer 330 may further store common header information of the data packets.

When an error is detected in the received data packets, the packet loss information generator 360 of the receiving station 300 generates packet loss information and transmits the packet loss information to the transmitting station 200 (S350). The packet loss information may be transmitted through an ACK/NACK message. The ACK/NACK message may be transmitted using a general ACK/NACK transmission scheme or a block ACK scheme. The block ACK scheme is to inform whether the receiving station 300 successfully receives the data packets of a data block when the transmitting station 200 transmits the data blocks comprising the plurality of the data packets to the receiving station 300 and to store. According to the block ACK scheme, the receiving station 300 stores information on wrongly received packets within certain duration and transmits the information to the transmitting station 200 at a time. Meanwhile, when the transmitting station 200 transmits the plurality of the data packets to the plurality of the receiving stations 300 in the multicast transmission scheme, each receiving station 300 performs steps S320 to S350. However, at step S350, when the receiving station 300 transmits the packet loss information using the block ACK scheme, the receiving station that listens to a block ACK of a neighboring receiving station may not the block ACK to avoid collisions.

The packet loss information processor 260 of the transmitting station 200 receives the packet loss information from the receiving station 300 and calculates a coding condition using the packet loss information (S360). The coding condition means a combination condition to recover each lost packet in each receiving station receiving when the transmitting station codes the plurality of the data packets and transmits the plurality of the data packets to the plurality of receiving stations in the multicast transmission scheme. In other words, the coding condition makes the coding packet combination using a sequential data packet but combines the most data packets so that there is no receiving station that generates two or more losses within the plurality of coded data packets, thereby securing the integrity of data packets as large as possible using one retransmission coding packet the coding packet combination.

The coder 240 of the transmitting station 200 generates the error control frame using the data packet stored in the transmitting buffer 230 (S370). At this time, the coder 240 codes the plurality of the data packets stored in the transmitting buffer into a single coded data packet to generate the error control frame. Coding the plurality of the data packets into the single coded data packet may be called network coding. The network coding may be performed by XOR operation of the plurality of the data packet. The detailed method of generating the error control frame using the network coding will be described below.

The error control header processor 250 of the transmitting station 200 performs the processing for a header and CRC of the error control frame (S380) and transmits the error control frame to the receiving station 300 (S390).

If the receiving station 300 receives the error control frame from the transmitting station 200, the error control header processor 350 of the receiving station 300 checks whether an error occurs in the error control frame by an CRC check (S400). The transmitting station 200 may add identifier representing the error control frame to the error control frame and the receiving station 300 can recognize the error control frame by the identifier.

The decoder 340 of the receiving station 300 decodes the error control frame and recovers lost data packets by use of the error control frame received from the transmitting station 200 and the data packets stored in the receiving buffer 330 (S410). Then, the receiving data header processor 320 of the receiving station 300 adds a header to recovered data packets by use of common header information of data packets stored in the receiving buffer 330 and transmits them to the receiving data processor 310. The receiving data processor 310 reorders the data packets stored in the receiving buffer 330 and the recovered data packets by a sequence number and transmits them to the upper layer in a data block unit.

Figure 5:
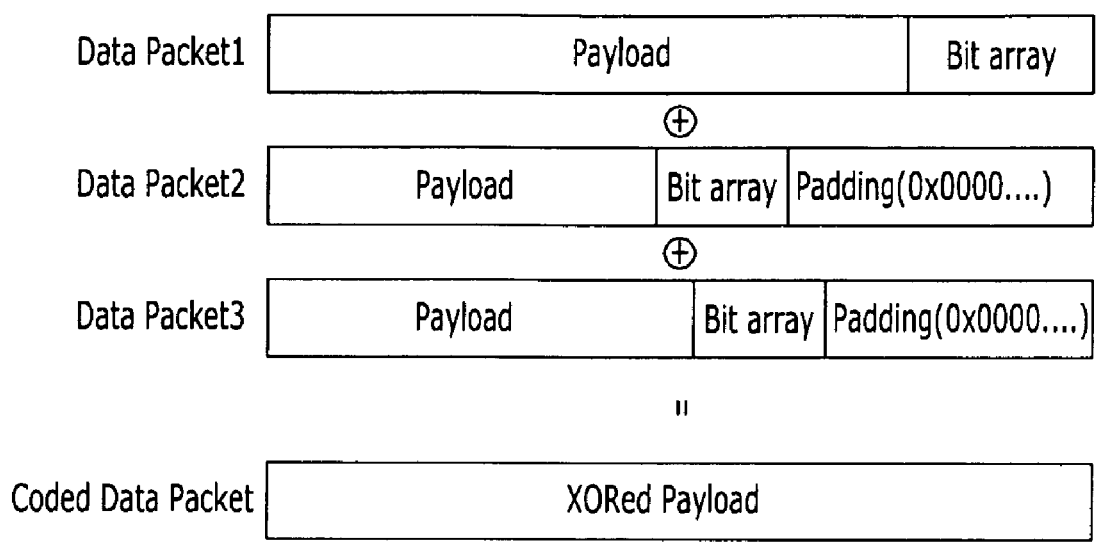
FIG. 5 shows a method for coding a plurality of data packets by a transmitting station according to an exemplary embodiment of the present invention.
Figure 6:
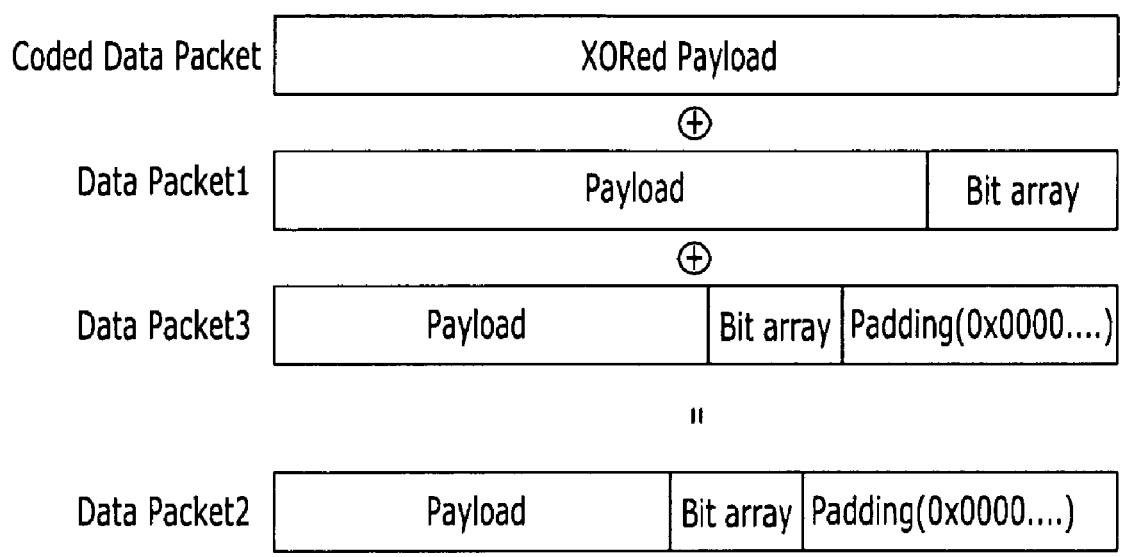
FIG. 6 shows a method for recovering lost data packets using data packets coded by a receiving station.

FIG. 5 shows a method of coding a plurality of data packets by a transmitting station according to an exemplary embodiment of the present invention and FIG. 6 shows a method of recovering lost data packets using data packets coded by a receiving station. It is assumed that a transmitting station transmits a data packet 1, a data packet 2, and a data packet 3 to a plurality of receiving stations and receives packet loss information from at least one receiving station.

Referring to FIG. 5, the transmitting station inserts a certain bit array (end of sequence (EoS)) in an end part of a payload of each data packet to code the data packet 1, the data packet 2, and the data packet 3. The bit array is a region used for searching the payload (that is, actual data parts) in coding the plurality of the data packets having different lengths of each payload and then decoding them.

The transmitting station compares the lengths of the data packet 1, the data packet 2, and data packet 3 into which the bit array is inserted and obtains a length of the longest data packet. Herein, it is assumed that the data packet 1 is the longest data packet.

The transmitting station adds padding bits on the end part of the data packet 2 and data packet 3 so that the lengths of the data packet 2 and the data packet 3 are equal to the length of the data packet 1.

The transmitting station codes the data packet 1, the data packet 2, and the data packet 3 having the same length. An XOR operation can be used for coding.

Referring to FIG. 6, the receiving station can recover lost data packets using a coded data packet received from the transmitting station. At the time of the initial transmission of the transmitting station, it is assumed that the data packet 1 and the data packet 3 are successfully received and the data packet 2 is lost. The receiving station recovers the data packet 2 by using the coded data packet received from the transmitting station and the data packet 1 and the data packet 3 received from the transmitting station and stored in the receiving buffer. For example, the receiving station performs the XOR operation for the coded data packet, the data packet 1, and the data packet 3, thereby making it possible to recover the data packet 2.

The receiving station searches a region from an end part of a recovered data packet 2 to an end part of the certain bit array, that is, the duration of the certain bit array and recognizes a region from the first point of the recovered data packet 2 before a start point of the certain bit array as a payload of the actual data packet 2.

Figure 7:
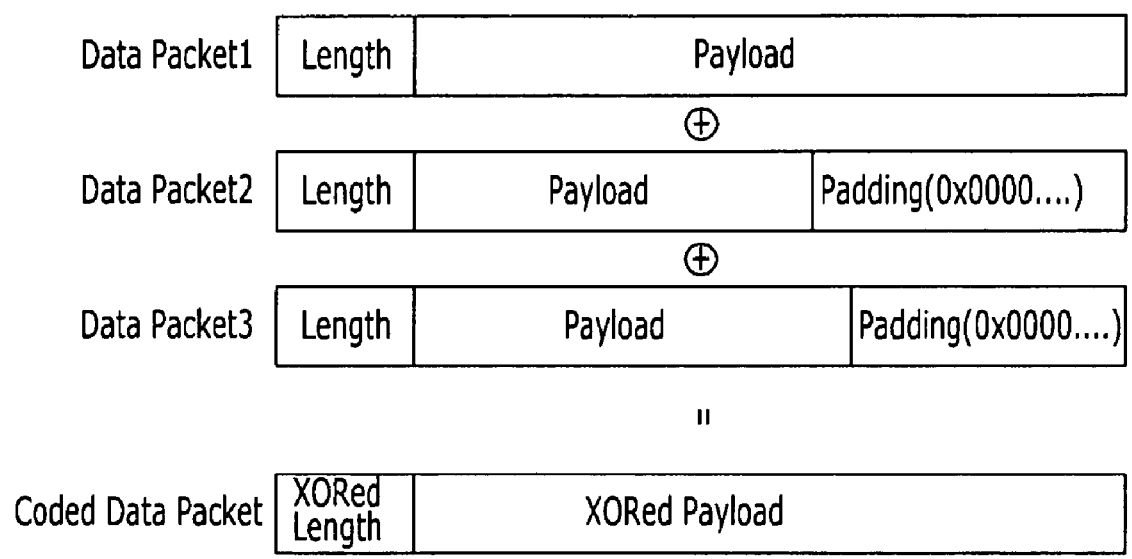
FIG. 7 shows a method for coding a plurality of data packets by a transmitting station according to another exemplary embodiment of the present invention.
Figure 8:
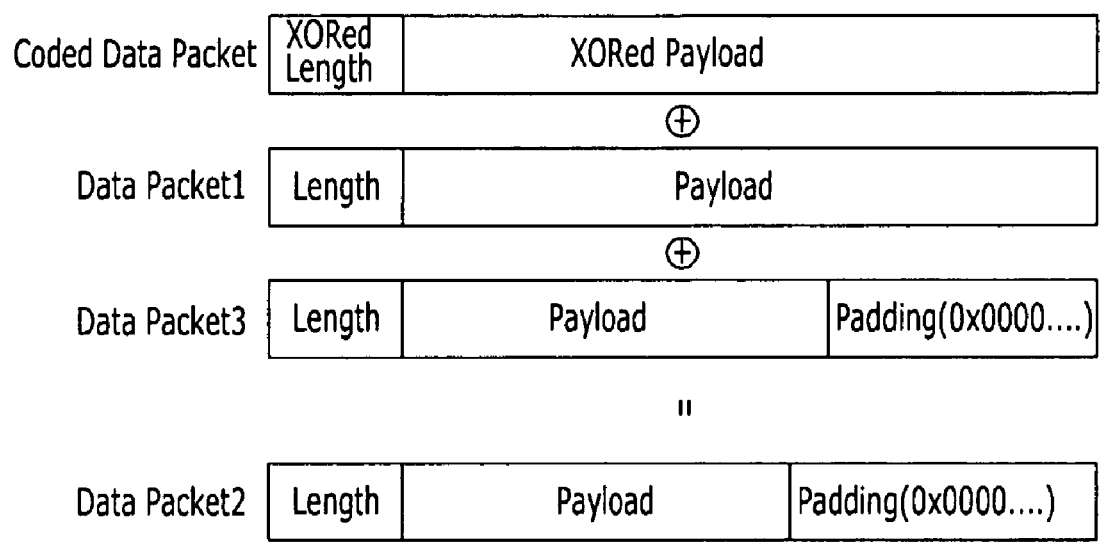
FIG. 8 shows a method for recovering lost data packets using data packets coded by a receiving station.

FIG. 7 shows a method of coding a plurality of data packets by a transmitting station according to another exemplary embodiment of the present invention, FIG. 8 shows a method of recovering lost data packets using data packets coded by a receiving station.

Referring to FIG. 7, a transmission station obtains lengths of data packet 1, data packet 2 and data packet 3 and stores the lengths in each length information field. Next, the transmitting station compares the lengths of the data packet 1, the data packet 2, and the data packet 3 and selects the longest data packet. Herein, it is assumed that the data packet 1 has the longest length.

The transmitting station adds padding bits to an end part of the data packet 2 and the data packet 3 so that the lengths of the data packet 2 and the data packet 3 are equal to the length of the data packet 1.

The transmitting station codes the data packet 1, the data packet 2, and the data packet 3 to have same lengths. An XOR operation can be used for coding.

Referring to FIG. 8, a receiving station receives a coded data packet from the transmitting station and performs an XOR operation for the coded data packets, successfully received data packet 1 and data packet 3, thereby making it possible to recover the data packet 2.

A coding unit finds out a length of the data packet 2 from a length definition field of the recovered data packet 2 and recognizes a region from a start point of the data packet 2 to the length as a payload of the actual data packet 2.

Figure 9:
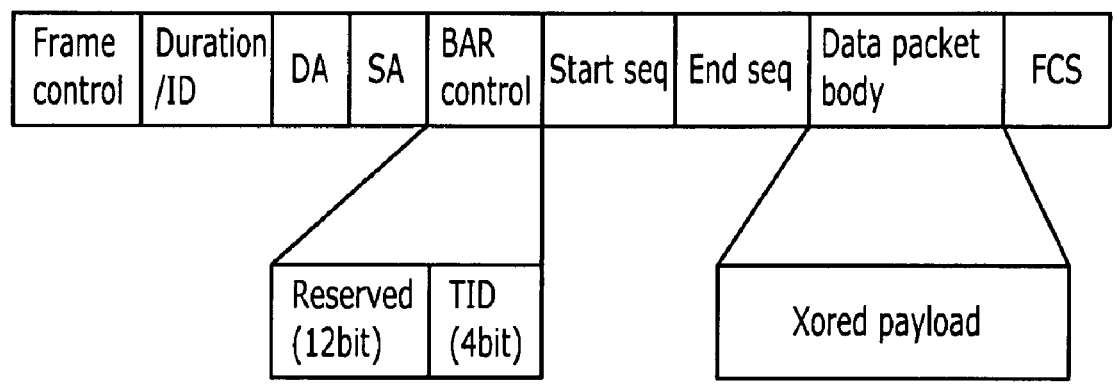
FIGS. 9 and 10 show one example of an error control frame according to an exemplary embodiment of the present invention.
Figure 10:
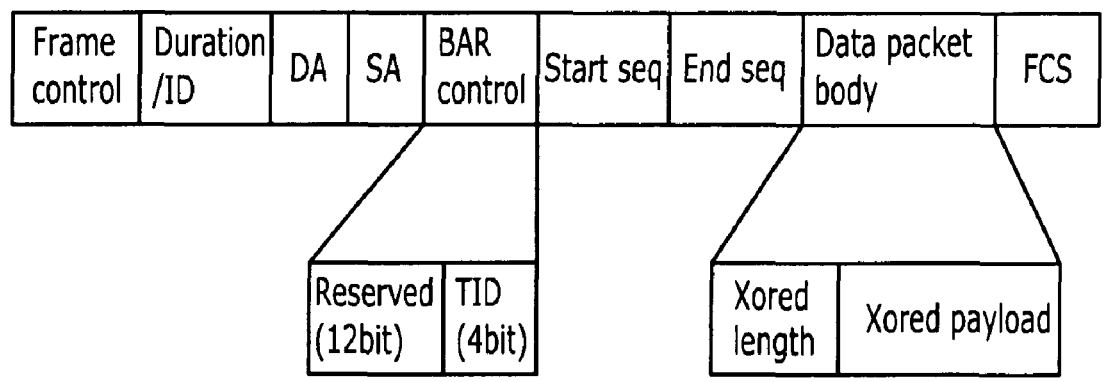

FIGS. 9 and 10 shows one example of an error control frame according to an exemplary embodiment of the present invention.

Referring to FIG. 9, the error control frame comprises a frame body and the frame body comprises the coded data packet shown in FIG. 5. Referring to FIG. 10, the error control frame comprises the frame body and the frame body comprises the coded data packet shown in FIG. 6.

The error control frame may have a newly defined frame structure or the conventionally defined frame structure. As one example, a structure of a block ACK request frame can be used as the error control frame. The block ACK request frame is a frame used to allow a transmitting station to transmit a data block including a plurality of data packets to a receiving station and then, to request a block ACK to the receiving station in order to see whether any data packet is successfully received.

As shown in FIGS. 9 and 10, the block ACK request frame used for the error control frame may further comprises a frame control field, a duration/ID field, a destination address (DA) field, a source address (SA) field, a block ACK request (BAR) control field, and a frame check sum (FCS) field, in addition to the frame body. The frame control field comprises information on a frame type and the duration/ID field comprises a network allocation vector. The DA field comprises a destination, that is, receiving station address and the SA field comprises a source, for example, transmitting station address. The BAR field comprises a block ACK request control information and comprises a traffic ID (TID) field including priority information to secure the quality of service (QoS). The FCS is a field that checks the error of the block ACK request frame.

Meanwhile, the error control frame may comprises an identification information indicating that the corresponding frame is the error control frame or the network coded data packets are transmitted. As one example, in order to transmit the coded data packets using the block ACK request frame structure, the identifier indicating that the corresponding frame is the error control frame can be inserted into the BAR control field of the block ACK request frame. In other words, it can inform that the corresponding frame is the error control frame using 12 bits other than the TID field among the BAR control field.

When the corresponding frame is the error control frame, the coded data packet may be inserted between the BAR control field and the FCS field. In other words, in the general block ACK request frame, the block ACK start sequence control field exists between the BAR control field and the FCS field. In order to use the block ACK request frame as the error control frame, a start sequence field, an end sequence field, and a data packet body field may be inserted into the position of the block ACK start sequence control field. Herein, the data packet body field includes the coded data packet. The coded data packet may be generated by the method shown in FIGS. 5 and 7. The start sequence field includes a sequence of the first data packet that a coding is started and the end sequence field includes a sequence of a finally coded data packet.

As described above, when a plurality of data packet uses an error control frame, a transmitting station can reduce the number of retransmission of the data packet for an error generated at a multicast transmission to a plurality of receiving stations. In addition, it supports the error control frame having variable lengths, thereby facilitating the implementation of the application layer and providing the various application fields.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for multicast transmission of a transmitting station in a wireless network, comprising:
   transmitting a plurality of data packets to a plurality of receiving stations;
   receiving information on loss of the plurality of the data packets from at least one of the plurality of the receiving stations;
   coding the plurality of the data packets into a single coded data packet based on the information on the loss of the plurality of the data packets; and
   transmitting an error control frame including the coded data packet to the plurality of the receiving stations.

2. The method of claim 1, wherein:
   the coding the plurality of the data packets comprises
   inserting a bit array into end parts of each of the plurality of the data packets;
   inserting padding bits in remaining data packets so that lengths of the remaining data packets other than the longest data packet of the plurality of the data packets into which the bit array is inserted are equal to a length of the longest data packet; and
   coding the plurality of the data packets into the single coded data packet.

3. The method of claim 1, wherein:
   the coding the plurality of the data packets comprises
   storing information on a length of each of the plurality of the data packets in a length information field of each data packet;
   inserting padding bits in remaining data packets so that lengths of the remaining data packets other than the longest data packet of the plurality of the data packets are equal to a length of the longest data packet; and coding the plurality of the data packets into the single coded data packet.

4. The method of claim 1, wherein:

the coding the plurality of the data packets comprises coding the plurality of the data packets into the single coded data packet by XOR operation for the plurality of the data packets.

5. The method of claim 1, wherein:

the transmitting the error control frame comprises generating the error control frame including the coded data packet; and transmitting the error control frame to the plurality of the receiving stations.

6. The method of claim 5, wherein:

the error control frame is transmitted using a block ACK request (BAR) frame structure.

7. A transmitting station, comprising:

a transmitting data processor that performs processes to receive a plurality of data packets from an upper layer and to transmit the plurality of the data packets to a receiving station;

a transmitting buffer that stores the plurality of the data packets received from the transmitting data processor; and a coding unit that codes the plurality of the data packets stored in the transmitting buffer into a single coded data packet when receiving packet loss information on the plurality of the data packet from the receiving station.

8. The transmitting station of claim 7, wherein:

the coding unit inserts a bit array into end part of each of the plurality of the data packets, inserts padding bits in remaining data packets so that lengths of the remaining data packets other than the longest data packet of the data packets into which the bit array is inserted are equal to a length of the longest data packet; and codes the plurality of the data packets into the single coded data packet by XOR operation for the plurality of the data packets.

9. The transmitting station of claim 7, wherein:

the coding unit stores information on a length of each of the plurality of the data packets in a length information field of each data packet, inserts padding bits in a remaining data packet so that lengths of the remaining data packets other than the longest data packet of the data packets are equal to a length of the longest data packet, and codes the plurality of the data packets into the single coded data packet by XOR operation for the plurality of the data packets.

10. The transmitting station of claim 7, further comprising:

a transmitting unit that transmits the single coded data packet using a block ACK request frame structure.

* * * * *